UNITED STATES PATENT OFFICE.

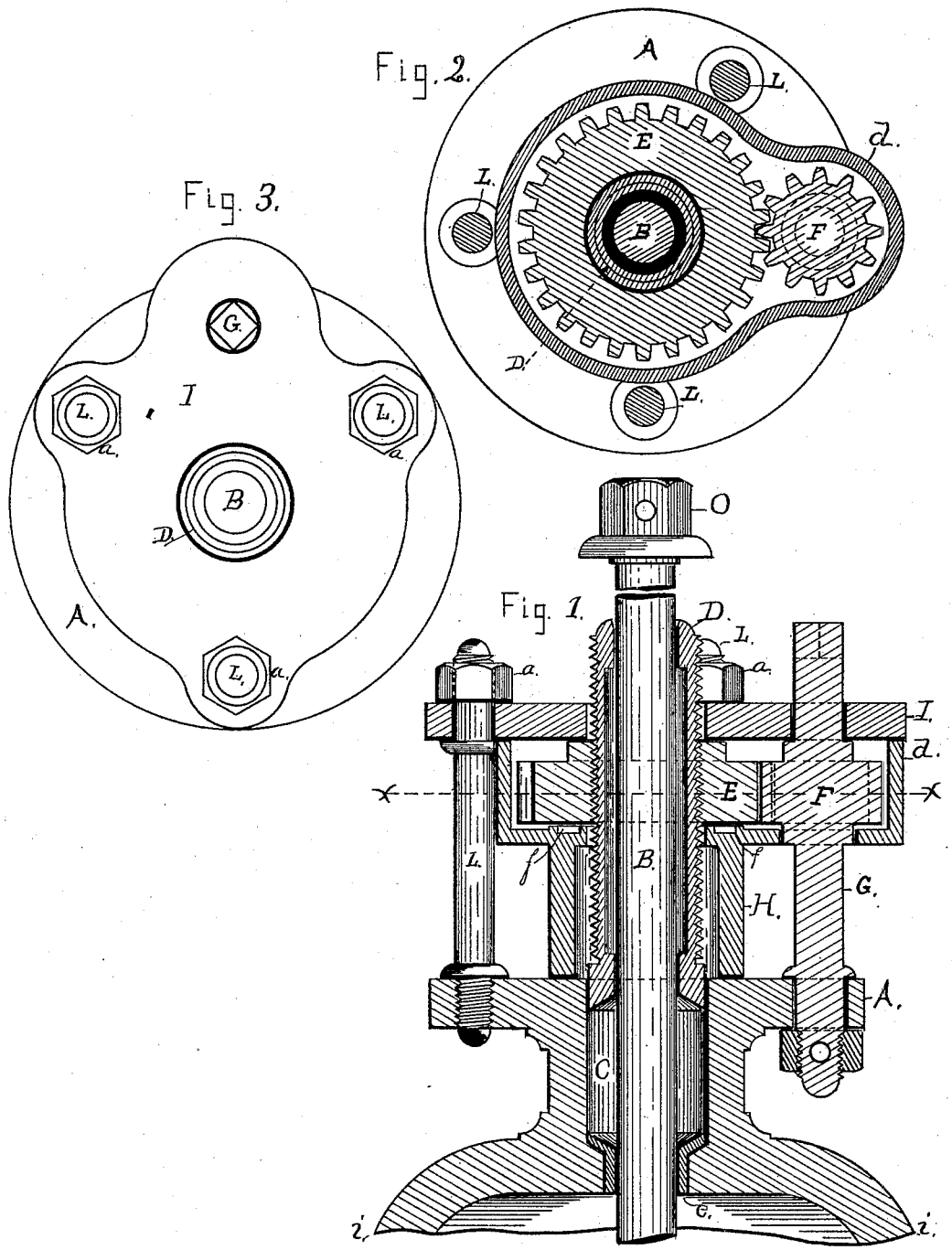

EDGAR P. HOLLY, OF SPRINGFIELD, MASSACHUSETTS, ASSIGNOR TO HIMSELF, ALVIN M. CUSHING, AND WILLIAM B. C. PEARSONS, OF SAME PLACE.

VALVE-PACKING DEVICE.

SPECIFICATION forming part of Letters Patent No. 473,554, dated April 26, 1892.

Application filed October 1, 1891. Serial No. 407,463. (No model.)

*To all whom it may concern:*

Be it known that I, EDGAR P. HOLLY, a citizen of the United States, residing at Springfield, in the county of Hampden and State of Massachusetts, have invented a new and useful Valve-Packing Device, of which the following is a specification.

My invention relates to improvements in valve-packing devices vertically or horizontally constructed in such a manner that the stem of valve may be packed or its leakage stopped without requiring immediate access to valves, (or any part of the same,) and is particularly applicable to valves located under ground fulfilling the offices of valves for water, steam, or gas.

The object of my invention is to dispense with the necessity and trouble of opening streets where valves leak at the stuffing-box or to reach them where it is not convenient in the ordinary way and at times always under perfect control of the persons in charge. I attain this object by the mechanism shown in the accompanying drawings, in which—

Figure 1 is a vertical section of the entire device, showing all its parts. Fig. 2 is a plan drawn through line $x\ x$ of Fig. 1; and Fig. 3 is a plan of Fig. 1, with nut O removed.

All figures are either plain elevations or plans.

Similar letters refer to similar parts throughout.

The common follower for stuffing or packing boxes or for pistons is held or retained in position in about three ways—viz., by a follower-nut, by a flange-follower with two bolts, or a flange-follower with three or more bolts.

What I propose to accomplish is the following: simply to have the packing-follower of valve always under control of a key in the hands of the operator, so that there shall be no bolts or set-screws to adjust and beyond the possibility of any to so adjust, except by means of said key. Flange A of Fig. 1 represents the ordinary form of top of valve hood or cover, and below is cut, as shown by irregular line $i\ i$ at bottom of drawings.

B is the valve-stem as in ordinary use.

C is the space for packing.

D is the packing-follower or that part of any valve that is intended by force or pressure to reduce the space C occupied by packing to prevent the escape of steam, water, gas, &c.

The follower D is simply an outer tube for the stem B, fitting the chamber C, and of requisite material and of sufficient strength to resist the thrust that may be necessary to force the packing in chamber C until all leakage is prevented. The outer circumference of the follower D is threaded nearly its whole length, as shown, and is long enough that it may descend to the bottom of chamber C.

E is a gear varying in diameter as in proportion to valve, which fits and matches internally the thread of the follower D.

F is a pinion corresponding in pitch and connection with the gear E. This pinion F is a part of the stud or standard G and is so connected that the moving of the stud or standard G to the right or left will raise or depress the follower D, as may be desired. The stud G should compress the packing in the chamber C, revolving in the same directions as the main valve-stem does in closing the main valve. The gear E is supported below by the sleeve H and above by the flange I, so that it must always remain in a certain position vertically. The flange I is supported or held in a fixed position by three or more stud-bolts L L L, with nuts at top $a\ a\ a$, holding and securing flange I absolutely positive and stationary. The stud-bolts L L L are securely screwed and keyed into the top flange of the cover A. The length of the above bolts L L L may in different-sized valves vary to suit conditions, making the distance between flange A and I more or less on different valves. The usual space or distance should be from three to four and one-half inches to have sufficient room for free operation of all parts and allow follower D to fulfill its office freely, and also in order that when the time may occur to renew the packing in chamber C, it may be accomplished in the least possible time and corresponding trouble.

I do not claim that the packing in chamber C will last always, but that if in the first place it be well filled with the best and most enduring packing it may be worn almost entirely out before an occasion will occur to renew it. From experience in this character of work I do not believe that packing will be necessary more than once in fifteen years. When it becomes necessary to repack valve-stem, remove the nuts on stud-bolts L L L and the nut *b* at bottom of standard G, raise the whole mechanism up and pack in the ordinary way, then replace by a reverse operation.

The nut *b* on the standard G is screwed home to a shoulder and then pinned, as shown by the circle *h*, and allows perfect freedom for the operation or revolution of the standard G. The flange or plate I is extended vertically at *n* from one-half to one inch in height, surrounding the follower D, thus forming a longer and better guide for said follower.

I have shown on follower D a V-thread, but do not confine myself to that kind, as a square thread may be and is probably better. The V-thread is shown in order to simplify drawings.

In order to prevent anything outside of valve to interfere with the perfect operation of my device, I have provided at or on sleeve H, extending horizontally and vertically, a shield *d*, which incloses the gear E and pinion F, meeting in contact the flange I, as shown in Figs. 1 and 2, thus absolutely preventing access from outside of anything that would or may interfere with gear E and pinion F, which may occur from a broken main or from some other leakage in main.

The valve may be always packed under water, even when its own leakage shall have brought about the above conditions. The conditions may vary; but the valve-stem may always be packed from the surface of the street or from other inaccessible points in underground work. The same box-opening that serves for the admission of key for opening or closing of valve also permits the admission of smaller key to attach with stud or standard G to compress or relieve pressure in chamber C.

My device will always uniformly compress the packing in chamber C, owing to its construction, and very unlike the ordinary valve where the packing is very unequally compressed by the system of screwing down one side or portion at a time when there are two, three, or more follower-bolts.

In metallic construction I should propose the following: the valve-stem B and follower D of brass and bronze, respectively, the gear E of steel, and pinion F of bronze, and the sleeve H and shield *d* of cast-iron. The nuts on bolts L L L, also the one at bottom of standard G, all to be of brass, so that there may be no adhesion or rusting together of parts necessary in construction to be separated. A bronze bushing *e*, as shown in Fig. 1, forms the contact with valve-stem B and packing-chamber C. In order to reduce friction by the operation of the gear E, I have channeled the upper portion or part of sleeve H, as at *f*, and may at same time accomplish the same object, where gear E comes in contact with flange I. I can also produce same results by placing a positive key in flange I and corresponding with a key-seat or keyway cut in follower D. Either way may be considered in the construction or manufacturing of device.

The intention of the above specification is to inform any person skilled in the art of mechanical manufacturing (together with drawings) to construct the device exactly as shown and described.

I do not confine myself to the proportions given, nor exact forms, so long as the important features of the device are maintained.

What I do claim as my invention, and desire to secure by Letters Patent, is—

A packing device comprising a chambered stuffing-box to contain packing, a vertical packing-follower therein resting on the packing, the upper end guided by a positively-fixed plate or flange, said follower threaded on its outer circumference, freely fitting a gear that matches and connects with a pinion-standard, said pinion-standard having a position vertical or parallel to follower and for its upper guide the plate or flange and for its lower bearing the stuffing-box flange, a sleeve interposed between the gear and stuffing-box to retain said gear in the same relative position to stuffing-box, so that by turning the pinion-standard to the right or left the follower will be correspondingly raised or depressed, for the purpose described and set forth.

EDGAR P. HOLLY.

Witnesses:
ROBERT A. KNIGHT,
GRACE P. BEMIS.